United States Patent
Walton et al.

(10) Patent No.: US 8,750,211 B2
(45) Date of Patent: Jun. 10, 2014

(54) METHOD AND APPARATUS FOR INCREASING SPECTRUM USE EFFICIENCY IN A MESH NETWORK

(75) Inventors: Jay Rodney Walton, San Diego, CA (US); Sanjiv Nanda, Ramona, CA (US)

(73) Assignee: QUALCOMM Incorporated, San Diego, CA (US)

( * ) Notice: Subject to any disclaimer, the term of this patent is extended or adjusted under 35 U.S.C. 154(b) by 262 days.

(21) Appl. No.: 13/281,065

(22) Filed: Oct. 25, 2011

(65) Prior Publication Data

US 2012/0039210 A1    Feb. 16, 2012

Related U.S. Application Data

(62) Division of application No. 11/680,065, filed on Feb. 28, 2007, now Pat. No. 8,089,881.

(60) Provisional application No. 60/778,747, filed on Mar. 3, 2006.

(51) Int. Cl.
    *H04L 12/26* (2006.01)

(52) U.S. Cl.
    USPC .......................................... 370/328; 370/252

(58) Field of Classification Search
    USPC .................. 370/328, 252, 253, 329, 330, 338
    See application file for complete search history.

(56) References Cited

U.S. PATENT DOCUMENTS

| | | | |
|---|---|---|---|
| 5,552,788 A * | 9/1996 | Ryan et al. | 342/30 |
| 6,253,063 B1 | 6/2001 | Cudak et al. | |
| 6,366,790 B1 * | 4/2002 | Kim | 455/562.1 |
| 6,463,105 B1 | 10/2002 | Ramesh | |
| 6,922,389 B1 | 7/2005 | Lundby | |
| 7,095,983 B1 | 8/2006 | Austin et al. | |
| 7,120,852 B2 | 10/2006 | Terry et al. | |
| 7,236,789 B2 | 6/2007 | Balachandran et al. | |
| 7,339,921 B2 | 3/2008 | Kim et al. | |
| 7,386,305 B2 * | 6/2008 | Etkin et al. | 455/422.1 |
| 7,426,395 B2 | 9/2008 | Stephens | |
| 7,463,644 B2 | 12/2008 | Zhu et al. | |
| 7,480,486 B1 * | 1/2009 | Oh et al. | 455/7 |
| 7,522,669 B2 | 4/2009 | Husted et al. | |

(Continued)

FOREIGN PATENT DOCUMENTS

| EP | 0865172 A2 | 9/1998 |
|---|---|---|
| EP | 1482654 | 12/2004 |

(Continued)

OTHER PUBLICATIONS

European Search Report and Written Opinion—EP08165174, Search Authority—The Hague, Nov. 10, 2008.

(Continued)

*Primary Examiner* — Brian D Nguyen
(74) *Attorney, Agent, or Firm* — QUALCOMM IP Department; James Hunt Yancey, Jr.

(57) ABSTRACT

Mesh Network Access Points (APs) points, including gateways and routers, are deployed over a geographic area. The APs monitor the communication channel for other carriers and transmit accordingly. The APs selectively co-transmit when other carriers are sensed, if the efficiency of the mesh network will improve. APs select a transmission rate based on observed carrier-to-interference ratios. APs use directional antennas to increase carrier-to-interference ratios and spectral efficiency. AP transmit schedules are adaptable and adjusted according to observed carrier-to-interference measurements.

20 Claims, 12 Drawing Sheets

(56) References Cited

U.S. PATENT DOCUMENTS

| | | |
|---|---|---|
| 7,538,717 B2 * | 5/2009 | Erikmats et al. ............. 342/159 |
| 7,548,758 B2 | 6/2009 | Periyalwar et al. |
| 7,623,443 B2 | 11/2009 | Johnston |
| 7,852,963 B2 | 12/2010 | Chen et al. |
| 7,920,501 B2 | 4/2011 | Larsson et al. |
| 8,089,881 B2 | 1/2012 | Walton et al. |
| 8,315,271 B2 | 11/2012 | Nanda et al. |
| 2002/0075829 A1 | 6/2002 | Sakoda |
| 2003/0011514 A1 * | 1/2003 | Kirchofer et al. ............. 342/372 |
| 2003/0026356 A1 | 2/2003 | Brommer |
| 2003/0181211 A1 | 9/2003 | Razavilar et al. |
| 2003/0191856 A1 | 10/2003 | Lewis et al. |
| 2004/0095907 A1 | 5/2004 | Agee et al. |
| 2004/0125012 A1 * | 7/2004 | Okamura et al. ................ 342/81 |
| 2004/0157613 A1 | 8/2004 | Steer et al. |
| 2004/0186365 A1 | 9/2004 | Jin et al. |
| 2004/0203913 A1 * | 10/2004 | Ogino et al. ................ 455/456.1 |
| 2004/0259565 A1 * | 12/2004 | Lucidarme .................... 455/453 |
| 2004/0263390 A1 | 12/2004 | Merenda et al. |
| 2005/0058151 A1 | 3/2005 | Yeh |
| 2005/0070266 A1 * | 3/2005 | Senarath et al. ........... 455/422.1 |
| 2005/0074019 A1 | 4/2005 | Handforth et al. |
| 2005/0083852 A1 * | 4/2005 | Alastalo et al. ............... 370/252 |
| 2005/0239411 A1 | 10/2005 | Hazra et al. |
| 2006/0009229 A1 | 1/2006 | Yuan et al. |
| 2006/0030346 A1 * | 2/2006 | Hayashi et al. ............... 455/515 |
| 2006/0050742 A1 | 3/2006 | Grandhi et al. |
| 2006/0077918 A1 * | 4/2006 | Mao et al. .................... 370/310 |
| 2006/0094371 A1 | 5/2006 | Nguyen |
| 2006/0109173 A1 * | 5/2006 | Erikmats et al. ............. 342/159 |
| 2006/0126536 A1 | 6/2006 | Patel et al. |
| 2006/0159052 A1 | 7/2006 | Koga et al. |
| 2006/0171396 A1 | 8/2006 | Singh et al. |
| 2006/0176834 A1 | 8/2006 | Dickerson et al. |
| 2006/0188031 A1 | 8/2006 | Liu |
| 2006/0221920 A1 | 10/2006 | Gopalakrishnan et al. |
| 2006/0286974 A1 | 12/2006 | Gore et al. |
| 2007/0060064 A1 | 3/2007 | Srikrishna et al. |
| 2007/0142067 A1 | 6/2007 | Cheng et al. |
| 2007/0155353 A1 | 7/2007 | Shapira et al. |
| 2008/0144493 A1 | 6/2008 | Yeh |
| 2008/0218404 A1 * | 9/2008 | Ma et al. ....................... 342/126 |
| 2012/0039296 A1 | 2/2012 | Walton et al. |
| 2012/0039340 A1 | 2/2012 | Walton et al. |
| 2012/0057455 A1 | 3/2012 | Walton et al. |
| 2012/0057494 A1 | 3/2012 | Walton et al. |

FOREIGN PATENT DOCUMENTS

| | | |
|---|---|---|
| EP | 1686713 | 8/2006 |
| JP | 2001320326 A | 11/2001 |
| JP | 2003332971 A | 11/2003 |
| JP | 2004072624 A | 3/2004 |
| JP | 2005020162 A | 1/2005 |
| JP | 2005079985 A | 3/2005 |
| JP | 2005278052 A | 10/2005 |
| JP | 2007502597 A | 2/2007 |
| JP | 2007531410 A | 11/2007 |
| JP | 2007533187 A | 11/2007 |
| KR | 200286987 | 11/2002 |
| WO | 9967967 | 12/1999 |
| WO | 0178431 | 10/2001 |
| WO | 03023895 A2 | 3/2003 |
| WO | 2004105410 A1 | 12/2004 |
| WO | 2005099195 A1 | 10/2005 |
| WO | 2005107164 A1 | 11/2005 |

OTHER PUBLICATIONS

European Search Report and Written Opinion—EP08165175, Search Authority—The Hague, Nov. 10, 2008.
Hiertz,G., et al., IEEE 802.11-05/0605r22—IEEE 802.11s—MAC Sublayer Functional Description, Mesh WLAN Security, Jun. 2005, XP-002401117, pp. 1-41, on Internet, http://www.ieee802.org/11/DocFiles/05/11-05-0605-02-OOOs-mesh-networks-alliance-proposal.doc.
IEEE 802.16.4C-01135, "Ofdma for Mesh Topology", Jul. 6, 2001, Version 0.34, XP002450933.
International Search Report—PCT/US2007/063340—International Search Authority, European Patent Office, Sep. 27, 2007.
Taiwanese Search report—096107445—TIPO—Aug. 6, 2010.
Written Opinion—PCT/US2007/063340, International Search Authority, European Patent Office, Sep. 27, 2007.

* cited by examiner

METHOD AND APPARATUS FOR INCREASING SPECTRUM USE EFFICIENCY IN A MESH NETWORK

CLAIM OF PRIORITY UNDER 35 U.S.C. §119

The present Application for patent claims priority to Provisional Application No. 60/778,747 filed Mar. 3, 2006, and assigned to the assignee hereof and hereby expressly incorporated by reference herein.

CLAIM OF PRIORITY UNDER 35 U.S.C. §120

The present application for patent is a Divisional and claims priority to patent application Ser. No. 11/680,065 entitled "Method and Apparatus for Increasing Spectrum use Efficiency in a Mesh Network" filed Feb. 28, 2007, now issued as U.S. Pat. No. 8,089,881, and assigned to the assignee hereof and hereby expressly incorporated by reference herein.

BACKGROUND

1. Field

The disclosure relates to mesh networks. More particularly, the disclosure relates to a method and apparatus for managing data flow through a mesh network.

2. Background

In recent years, there has been an increase in demand for widespread access to high speed data services. The telecommunication industry has responded to the increase in demand by offering a variety of wireless products and services. In an effort to make these products and services interoperable, the Institute for Electrical and Electronics Engineers (IEEE) has promulgated a set of wireless local area network (WLAN) standards, e.g., IEEE 802.11. The products and services that conform to these standards are frequently networked in a wireless point to multipoint configuration. In one configuration, individual wireless devices (e.g., stations) may communicate directly with an Internet access point, with each of the wireless devices sharing the available bandwidth.

A more efficient and resilient network can be realized through the use of a mesh network. A mesh network is a distributed network having multiple wireless mesh points. Each mesh point in the mesh network may act as a repeater capable of receiving traffic streams (TSs) and relaying the TSs to the next mesh point. A TS may proceed from an origination mesh point to a destination mesh point by hopping from mesh point to mesh point. TS routing algorithms insure that TSs are routed efficiently from their origination mesh point to their destination mesh point. TS routing algorithms may dynamically adapt to changes in the mesh network and may make the mesh network more efficient and resilient. For example, in the event a mesh point is too busy to handle the TS or a mesh point has dropped out of the mesh network, the TS routing algorithm may route the TS to the destination mesh point through other mesh points in the mesh network.

Mesh networks may frequently include a hierarchy of mesh points with different operating characteristics. In some mesh network architectures, clients are mesh points at the bottom of the hierarchy. Clients are individual wireless devices such as a laptop computer or a personal digital assistant. Access Points (APs) are mesh points that are a layer above the clients forming a wireless skeleton for the mesh network. Some APs are wired and are referred to as gateways since they form a bridge between the mesh network and other networks. Other APs may be wireless and are referred to as routers since they may route TSs between clients and gateways.

Currently, there is no generally accepted standard for routing TSs through a mesh network. Creating a standard for wireless mesh networks and dynamic routing through wireless mesh networks is one of the objectives of the IEEE 802.11(s) working group. A standard ensures that wireless devices and services conforming to the standard are interoperable. Large scale production of wireless devices and services conforming to 802.11(s) or other standards promises to increase the use and deployment of mesh networks.

The deployment of an amorphous and distributed communication apparatus in a small geographic area requires efficient use of the available spectrum, particularly for mesh points such as APs that carry large traffic loads. It has been recognized by those skilled in the art that apparatuses and methods that increase the productive use of the available spectrum in a mesh network are desired.

SUMMARY

A method of managing use of a communication channel in a mesh network comprising monitoring a communication channel for one or more carriers, measuring signal strength for the one or more carriers and transmitting data if the signal strength meets a condition. A method of dynamically scheduling access point communication between wireless access points comprising determining an interference condition on an available channel at a first access point and scheduling the first access point to transmit to a second access point if the interference condition meets a condition.

A mesh network having a plurality of network access points (APs) including gateways and routers distributed over a geographic area. The gateways may be wired APs. The routers may be unwired APs that route TSs between clients (e.g., wireless devices) and gateways. APs may dynamically assess the state of the communication channel in their neighborhood to determine, if, and when, to transmit. APs may sense at their location the received strength of carrier waves transmitted from other APs. Each AP may estimate the effect of co-transmitting with each of the observed carrier waves. If co-transmitting increases the spectral efficiency of the mesh network, the AP may transmit. The APs may also estimate the carrier to interference ratio and adjust their transmit rate accordingly. The APs may also sectorize their data links using a directional antenna. APs may also to changes in the mesh network environment.

BRIEF DESCRIPTION OF THE DRAWINGS

The features, objects, and advantages of the disclosure will become more apparent from the detailed description set forth below when taken in conjunction with the drawings, wherein.

DETAILED DESCRIPTION

Methods and systems that implement the embodiments of the various features of the disclosure will now be described with reference to the drawings. The drawings and the associated descriptions are provided to illustrate embodiments of the disclosure and not to limit the scope of the disclosure. Reference in the specification to "one embodiment" or "an embodiment" is intended to indicate that a particular feature, structure, or characteristic described in connection with the embodiment is included in at least an embodiment of the disclosure. The appearances of the phrase "in one embodiment" or "an embodiment" in various places in the specification are not necessarily all referring to the same embodiment. Throughout the drawings, reference numbers are re-used to indicate correspondence between referenced elements. In addition, the first digit of each reference number indicates the figure in which the element first appears.

Figure 1:
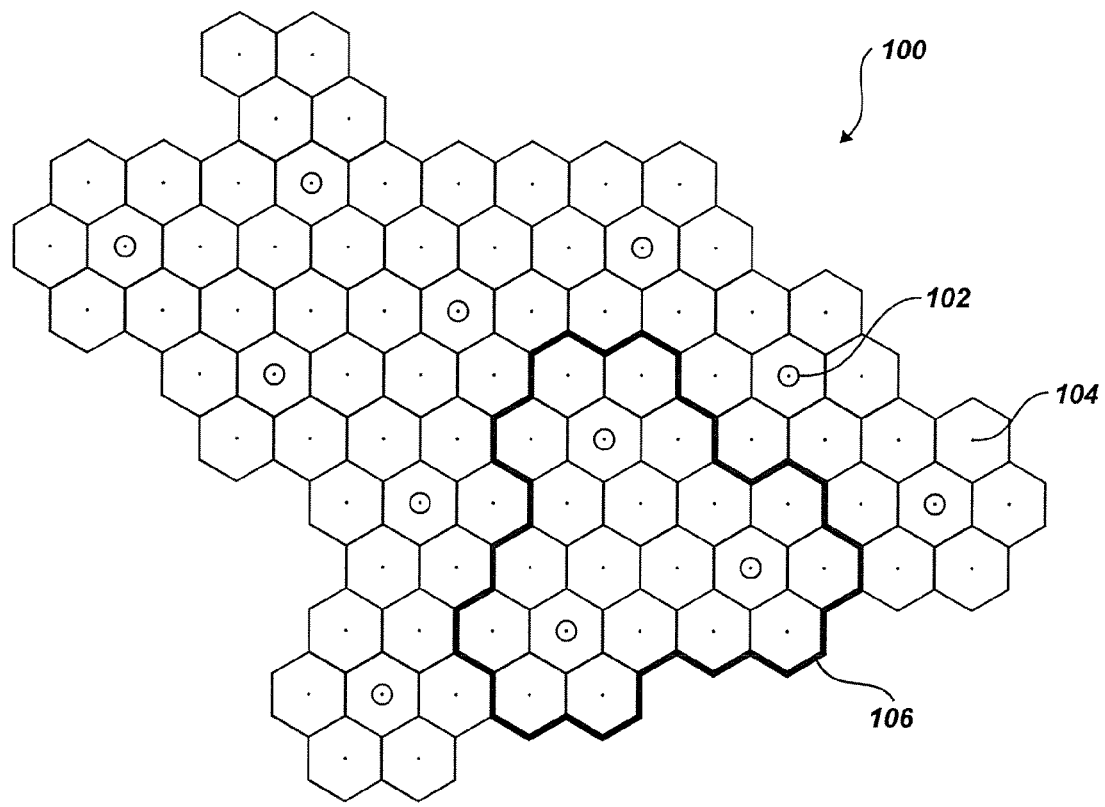
FIG. 1 is a diagram of an exemplary mesh network according to an embodiment.

FIG. 1 is a diagram of an exemplary mesh network 100 according to an embodiment. In one embodiment, the mesh network 100 has twelve gateways 102 (designated by a circle around a dot) and seventy-six routers 104 (designated by a dot). A representative portion 106 includes three gateways 102 and eighteen routers 104.

The gateways 102 may be wired access points (APs). The gateways 102 may form a bridge between the mesh network and other networks. For example, one or more gateways 102 may be wired to the Internet, thus bridging the mesh network 100 to the Internet. The routers 104 may be wireless APs that communicate with the gateways 102 and other routers 104. The APs may provide a skeleton like structure for communication flow in the mesh network 100. The APs may communicate with clients (not shown), such as laptop computers, mobile phones, and personal digital assistants. The APs may communicate with other APs over one or more communication channels. The APs may also communicate with clients over one or more communication channels.

TSs bound for a client may enter the mesh network 100 through the gateways 102. TSs from a client may depart the mesh network 100 through the gateways 102. Clients near one of the gateways 102 may establish a direct wireless link with one of the gateways 102. Clients out of range of one of the gateways 102 may establish an indirect wireless link with a gateway 102 through one or more routers 104.

The mesh network 100 of FIG. 1 is shown as a cellular configuration. Each gateway 102 may be surrounded by six routers 104 forming a cluster. This cellular configuration is shown as an example. The topology of any mesh network may depend to a large extent on topography. For example, a mesh network deployed on a college campus may have a topology that appears to be pseudo random. The gateways 102 may be computers located in Internet wired buildings connected with antennas mounted on the roof. The routers 104 may be collocated with lamp posts providing a convenient source of power. This topology may allow a college to inexpensively extend its Internet coverage to areas of the campus far from the Internet wired buildings. Although this topology results in irregular cell shapes and sizes, the principles and ideas discussed herein apply.

Figure 2:
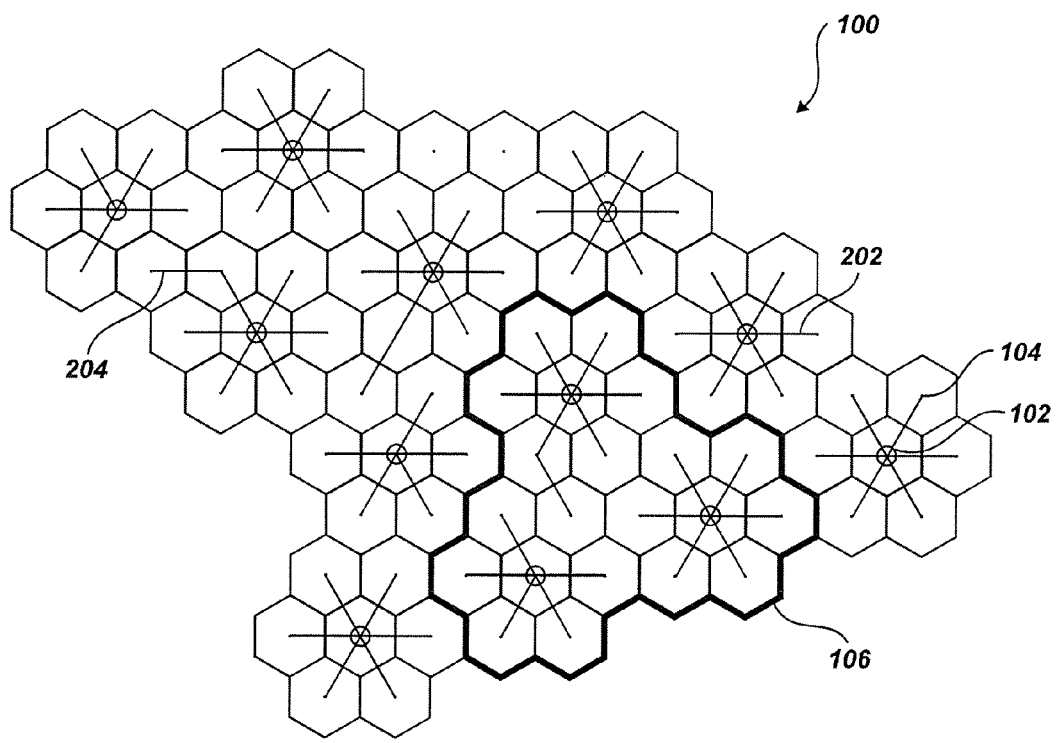
FIG. 2 is a diagram of an exemplary topography of TS flows through the exemplary mesh network of FIG. 1 according to an embodiment.

FIG. 2 is a diagram of an exemplary topography of TS flows through the exemplary mesh network of FIG. 1 according to an embodiment. In particular, FIG. 2 shows exemplary TS privileges negotiated between the gateways 102 and the routers 104 of the mesh network 100. Most of the routers 104 may have negotiated direct wireless links with the closest gateway 102. However, some routers 104 may have negotiated an indirect wireless link 204 to a gateway 102 through another router. For indirect links 204, TSs may hop from one router to another router. Indirect links 204 may be established for many reasons including: shadowing; preventing the establishment of a direct link with a gateway 102; the gateway 102 denying access to the router 104 because it is operating near capacity; and too much TS traffic in the neighborhood of the closest gateway 102.

Direct links 202 and indirect links 204 between the gateways 102 and the routers 104 make the mesh network 100 resilient and adaptable. Routers 104, unable to access the gateways 102 directly, may forward TSs to the gateways 102 through other routers. Routers 104 may also receive TSs forwarded from the gateways 102 through other routers. TS may be routed around inoperable or busy gateways 102 and routers 104. Each gateway 102 and router 104 may also negotiate its wireless links and the data rates of those links. Each gateway 102 and router 104 may attempt to balance loads, adapt to imperfect topologies, or adapt to log normal shadowing. Each gateway 102 and router 104 may estimate or measure carrier-to-interference ratios so that it may appropriately manage its data links.

Figure 3:
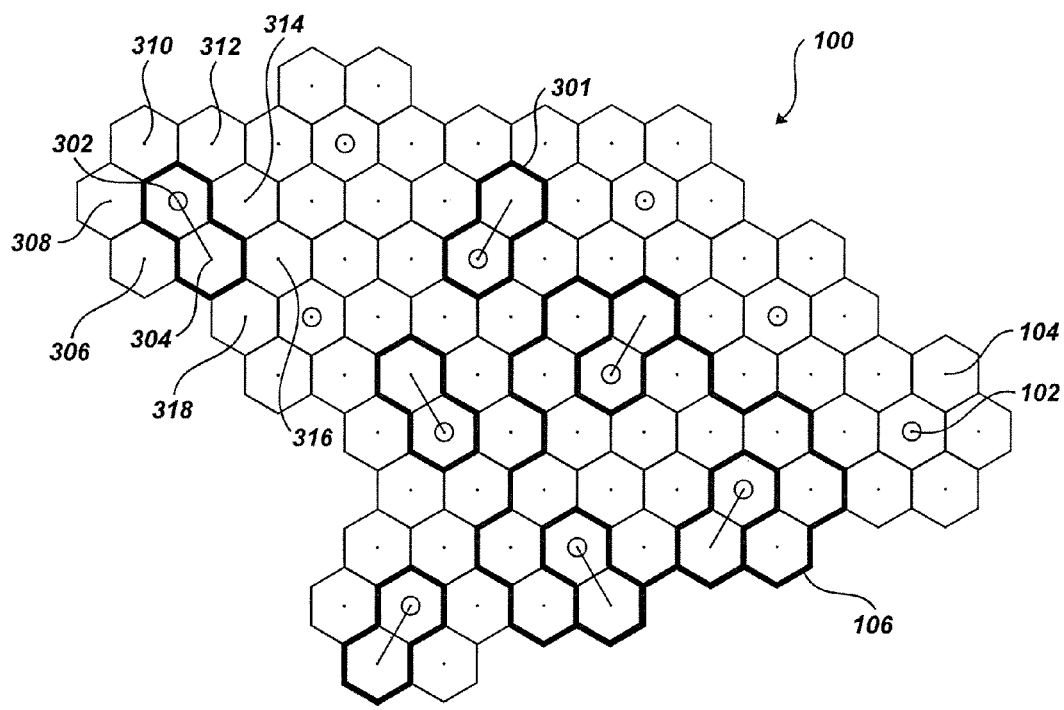
FIG. 3 is a diagram of TS flow pairs in the mesh network in accordance with carrier sense multiple access (CSMA) according to an embodiment.

FIG. 3 is a diagram of TS flow pairs 301 in the mesh network 100 in accordance with CSMA according to an embodiment. In this embodiment, gateways 102 and routers 104 monitor the communication channel for the carrier waves of other gateways and routers. If a carrier wave is sensed, the gateway 102 and the router 104 avoids transmitting TSs. In this way, co-channel interference is minimized. For example, if the gateway 302 is transmitting to the router 304, then the carrier wave of the gateway 302 may be sensed by routers 306, 308, 310, 312, 314, 316 and 318. These routers may not transmit until the carrier wave of the gateway 302 is no longer sensed.

Many factors may affect which router senses the carrier wave of the gateway 302 during transmission. These factors may include the transmission power of the gateway 302, the log normal shadowing, environmental conditions, etc. The carrier wave of the gateway 302 may be sensed at neighboring routers 306, 308, 310, 312 and 314 as well as non-neighboring routers 316 and 318. In some embodiments, the carrier wave of the gateway 302 may be sensed by other gateways.

Seven TS flow pairs 301 (e.g., the gateway 302 and the router 304) are shown in FIG. 3. The TS flow pairs 301 are limited in number because each gateway or router may not sense another carrier before transmitting. The links of the network, however, are relatively efficient since it is likely that there is a relatively small amount of link-to-link co-channel interference.

Figure 4:
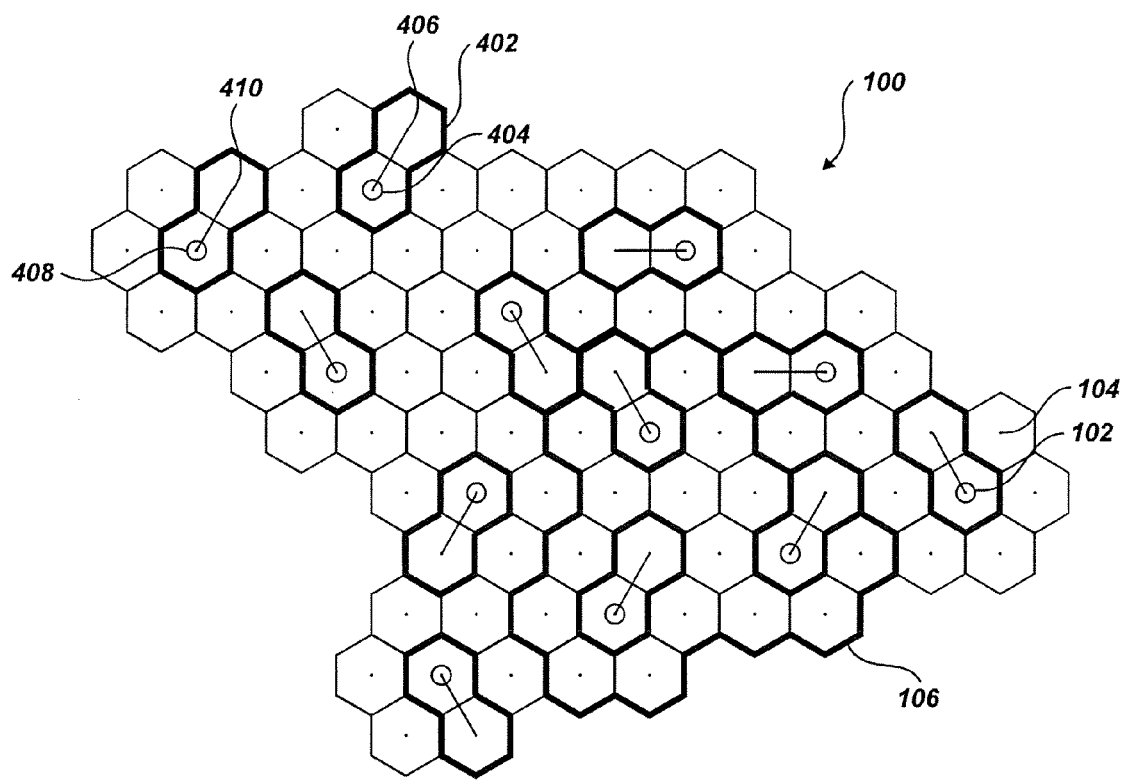
FIG. 4 is a diagram of co-transmitting TS flow pairs in the mesh network in accordance with soft CSMA according to an embodiment.

FIG. 4 is a diagram of co-transmitting TS flow pairs 402 in the mesh network in accordance with soft CSMA according to an embodiment. The gateways 102 and the routers 104 monitor the communication channel for other gateways and routers. If a carrier wave is sensed, the gateway or router evaluates whether the spectral efficiency of the mesh network 100 may be improved if the gateway or router co-transmits over the channel. For example, the gateway 404 may have a link with the router 406. The gateway 408 may be able to sense the carrier of the gateway 404. The carrier of the gateway 404, however, may be fairly well attenuated at the gateway 408. The gateway 408 may assess the signal strength of the gateway 404 and determine that it may establish a link with the router 410.

The established link may have some co-channel interference and may not be as robust as it would be without the interference. The gateway 408 may also adjust its data rate to the router 410 to compensate for any decrease in the expected signal-to-noise ratio at the router 410 due to the co-channel interference. Similarly, the gateway 402 may adjust its data rate to the router 404 to compensate for any decrease in the signal-to-noise ratio.

By allowing some co-channel interference, the throughput of each individual flow pair is reduced. However, the number of flow pairs in the mesh network may be increased. In this embodiment, the number of flow pairs supported by the mesh network is twelve. Thus, in this embodiment, individual link efficiency is reduced but aggregate mesh throughput is increased. It can be shown that the amount of information carried through the mesh network is proportional to:

$$N \log_2(1+\gamma)$$

where:

N=the number of links; and

γ=mean carrier to interference ratio.

Each of the gateways and the routers may maintain a table of the sensed carrier power observed. The gateways and the routers may make a determination if co-transmitting will increase or decrease the mesh efficiency. If co-transmitting increases the mesh efficiency, they may transmit. The gateways and routers may then adjust their data rates based on estimated or measured co-channel interference to optimize the individual data rates of each of the TS flow pairs 402.

Figure 5:
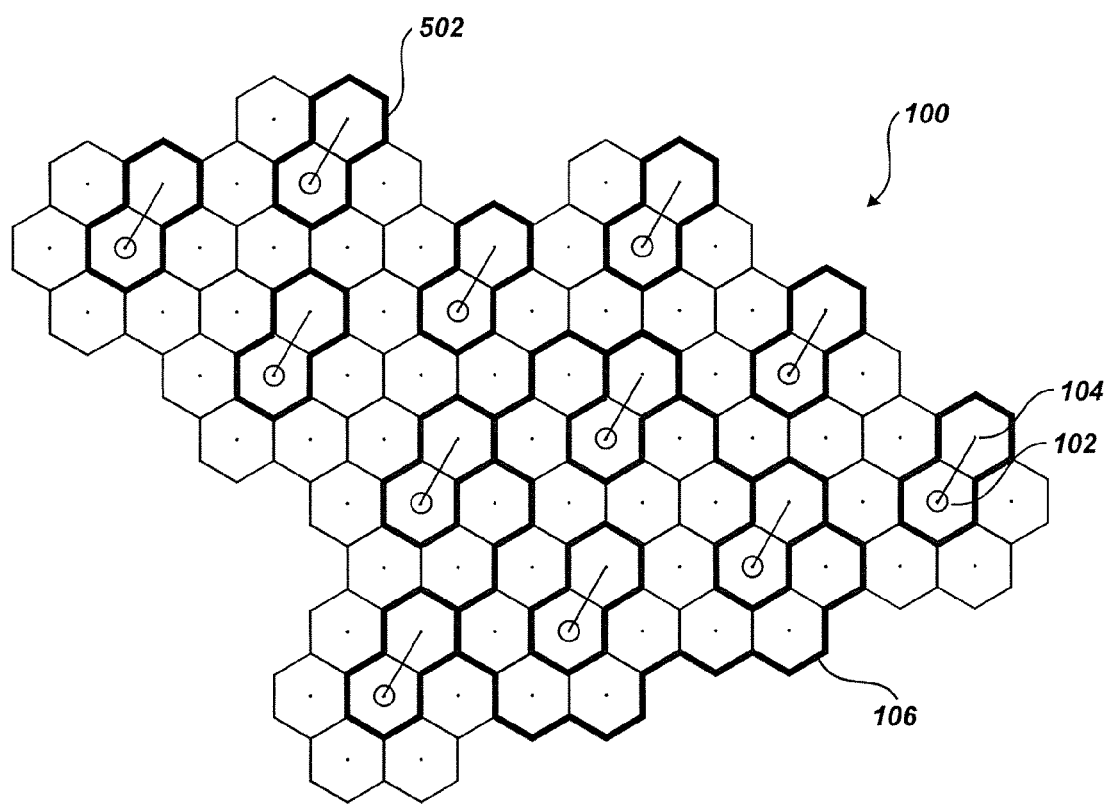
FIG. 5 is a diagram of TS flow pairs where synchronized transmissions may occur between the gateways and the routers according to an embodiment.

FIG. 5 is a diagram of TS flow pairs 502 where synchronized transmissions may occur between the gateways 102 and the routers 104 according to an embodiment. The transmissions from the gateways 102 to the routers 104 may be timed based on the relative bearing from the gateway 102 to the router 104. The illustration shows that all the TS flow pairs have routers 104 that are to the north-northeast of the gateways 102.

The TS flow pairs 502 may be synchronized according to a time division multiple access (TDMA) scheme. For example, the first time slot may be assigned to gateways 102 transmitting to routers 104 with a relative bearing to the north-northeast. The second time slot may be assigned to the gateways 102 transmitting to the routers 104 with a relative bearing to the east. The third time slot may be assigned to the gateways 102 transmitting to the routers 104 in the south-southeast. The fourth time slot may be assigned to the gateways 102 transmitting to the routers 104 in the south-southwest. The fifth time slot may be assigned to the gateways 102 transmitting to the routers 104 in the west. The sixth time slot may be assigned to the gateways 102 transmitting to the routers 104 in the north-northwest.

Figure 6:
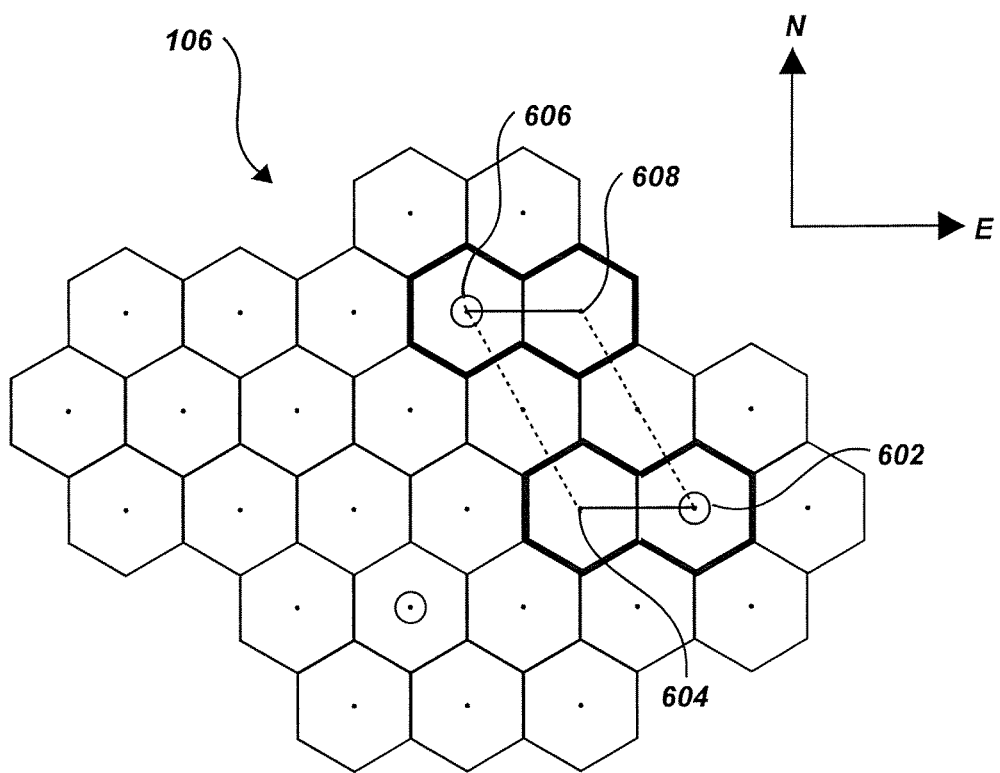
FIG. 6 is a diagram illustrating co-channel interference between TS flow pairs in a portion of the mesh network according to an embodiment.

FIG. 6 is a diagram illustrating co-channel interference between TS flow pairs in a portion of the mesh network 100 according to an embodiment. As discussed above, the efficiency of the mesh network 100 can be improved if co-channel interference is tolerated. The gateway 602 has established a link with the router 604. Some of the radio frequency energy from this link may be sensed by both the gateway 606 and the router 608. If the sensed carrier wave strength is low enough, the gateway 606 may establish a link with the router 608 improving the overall efficiency of the mesh network 100.

For illustration purposes, if we assume that the two links shown in FIG. 6 are the only links in the mesh network 100, the improvement in mesh throughput capacity may be estimated using the following equation: $N \log_2(1+\gamma)$ where N is the number of active links and gamma is the achieved SNR for each link (assuming to be equal for all links). For example, if the SNR of the link between the gateway 602 and the router 604 (e.g., only two devices enabled in the mesh network) is 20 dB, the spectral efficiency of the single link is $N \log_2(1+\gamma)=1 \log_2(1+100)=6.65$ bps/Hz without co-channel interference. If the gateways 602 and 606 are co-transmitting and the SNR observed on each link is 17 dB because of mutual co-channel interference, the spectral efficiency of the single link $N \log_2(1+\gamma)=1 \log_2(1+50)=5.67$ bps/Hz. However, since we have enabled two links in cluster 106, the spectral efficient has increased to 11.35 bps/Hz because two links are transmitting. Thus, in this example, it would be prudent to establish the dual links and tolerate co-channel interference, since the information throughput is almost doubled. The throughput efficiency is almost doubled despite only a 15% decrease in the individual link efficiency as a result of co-channel interference.

The throughput of the mesh network 100 may also be improved if some of the gateways and/or the routers employ noise cancellation. Multiple Input Multiple Output (MIMO) spatial channels may be available on some gateways and routers. MIMO may be realized through the use of multiple element antennas. For example, a multiple element antenna may feature a 4×4, a 4×2 or a 2×2 grid of antenna elements. The gateway or the router may introduce phase delay to signals bound for the antenna element producing a directional antenna beam. The directional antenna beam may be adaptable allowing the gateway or the router to focus the beam toward a particular gateway, router or sector. The gateway or the router may also introduce phase delay to produce two or more directional beams allowing the gateway or the router to focus the beam on multiple areas of interest.

Some of the elements of the antenna may also be used for interference canceling. Interference canceling may be particularly effective for reducing co-channel interference. For example, the gateway 602 may sense a large carrier wave from the router 608. If the gateway 602 has a MIMO antenna, it may use two or more of the elements of the antenna to compare arriving signals and cancel signals arriving from the direction of the router 608, reducing or eliminating the router 608 as a source of co-channel interference. Interference canceling in effect is analogous to antenna null steering.

Figure 7:
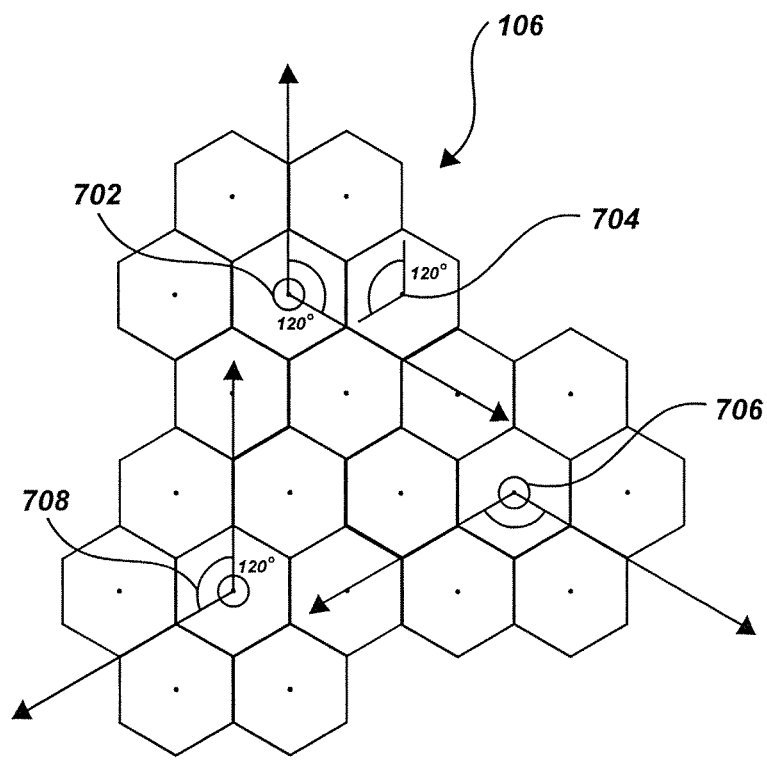
FIG. 7 is a diagram illustrating antenna sectoring in a portion of the mesh network according to an embodiment.

FIG. 7 is a diagram illustrating antenna sectoring in a portion of the mesh network 100 according to an embodiment. The gateways and/or the routers employ sectored antennas to improve carrier-to-interference ratios. The carrier signal strength may be increased through antenna gain and the co-channel interference may be decreased by reducing interference from co-transmitting gateways and routers. For example, the gateway 702 may have both an omni-directional antenna capability as well as a sectored antenna capability. The gateway 702 may monitor the communication channel using its omni-directional antenna until it senses a request-to-send (RTS) message. The gateway 702 may use its sectored antenna capability to establish a link with the router that sent the RTS, for example, router 704. The router 704 may also have a sectored antenna capability further increasing the expected carrier-to-interference ratio.

Each antenna sector may be 120 degrees providing almost 10 dB of antenna gain over an omni-directional antenna. Each antenna sector may also be smaller providing even more gain and less co-channel interference. Antenna sectoring may conform to a mesh network sectoring scheme, for example, a first sector may have relative bearings of 0-120 degrees, a second sector may have relative bearings of 121-240 degrees and a third sector may have relative bearings of 241-359 degrees. Alternatively, the sector scheme may be ad-hoc with each of the gateways and routers independently sectoring transmit and receive space.

Figure 8:
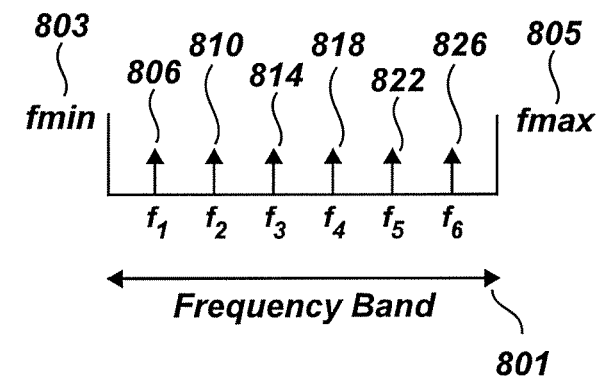
FIG. 8 is a diagram illustrating a cluster from the mesh network using Orthogonal Frequency Division Multiple Access (OFDMA) according to an embodiment.
Figure 8:
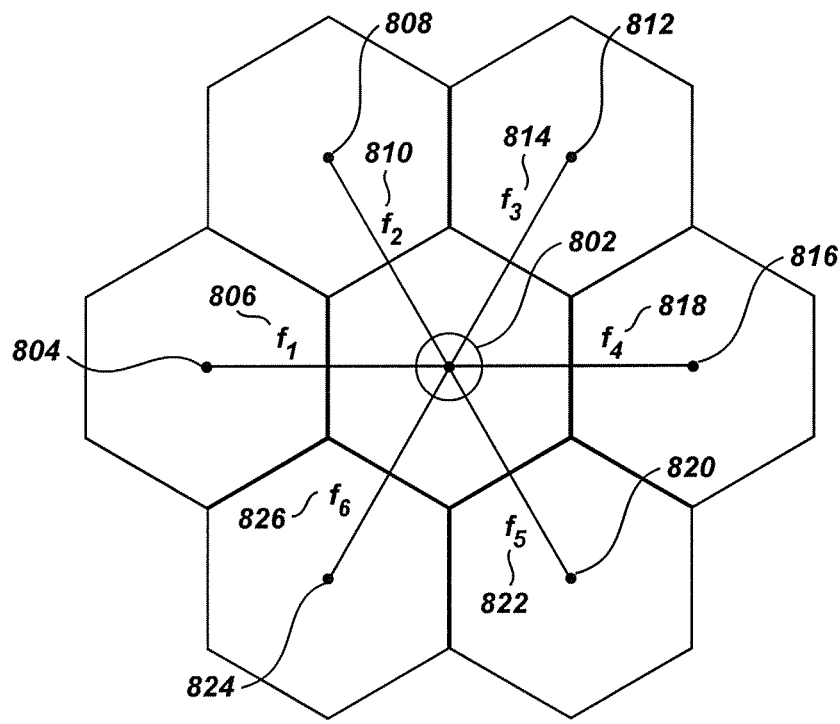

FIG. 8 is a diagram illustrating a cluster from the mesh network using Orthogonal Frequency Division Multiple Access (OFDMA) according to an embodiment. In this embodiment, the gateways and/or the routers employ OFDMA to improve carrier-to-interference ratios. Using OFDMA, a gateway, such as gateway 802, may transmit over a frequency band 801 (e.g., between fmin 803 and fmax 805). The routers, however, transmit over smaller bands centered on different tones of the frequency band. For example, the router 804 may transmit on a first frequency band around a first frequency tone f1 806, the router 808 may transmit on a second frequency band around a second frequency tone f2 810, the router 812 may transmit on a third frequency band around a third frequency tone f3 814, the router 816 may transmit on a fourth frequency band around a fourth frequency tone f4 818, the router 820 may transmit on a fifth frequency band around a fifth frequency tone f5 822, and the router 824 may transmit on a sixth frequency band around a sixth frequency tone f6 826.

Figure 9:
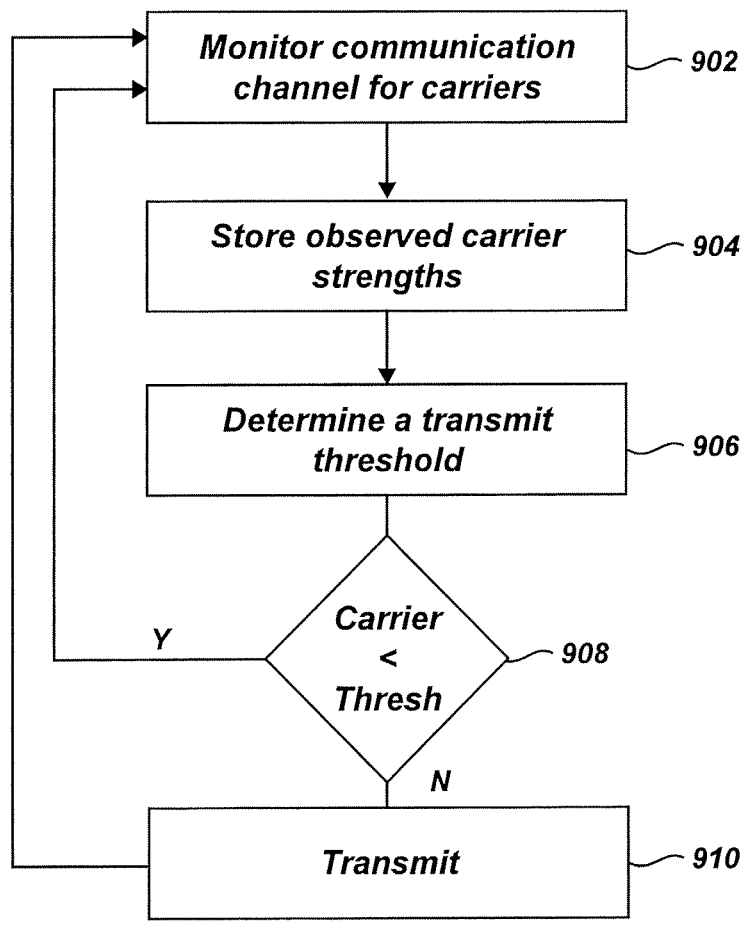
FIG. 9 is a flow diagram illustrating a method of spectral reuse for improving the efficiency of the mesh network according to an embodiment.

FIG. 9 is a flow diagram illustrating a method of spectral reuse for improving the efficiency of the mesh network according to an embodiment. A gateway or a router monitors the communication channel for carriers (902). If a carrier wave is sensed, the gateway or the router stores the observed carrier strength (904). The gateway or the router then determines a transmit threshold (906). The transmit threshold is based on the observed carrier strengths. The transmit threshold may be a value based on the statistical expectation that transmitting from the gateway or the router will increase the spectral efficiency of the mesh network 100. This expectation may be calculated using the rate equation $N \log_2(1+\gamma)$ as explained above. The gateway or the router may compare the sensed carrier strengths with the threshold (908). If the carrier strength is greater than the threshold, it indicates that co-transmitting from the gateway or the router at this time would result in reduced spectral efficiency and the gateway or the router should remain silent. If the carrier is less than the sensed threshold, the gateway or the router should transmit (910) even though there will be some co-channel interference since the mesh network efficiency will increase.

Figure 10:
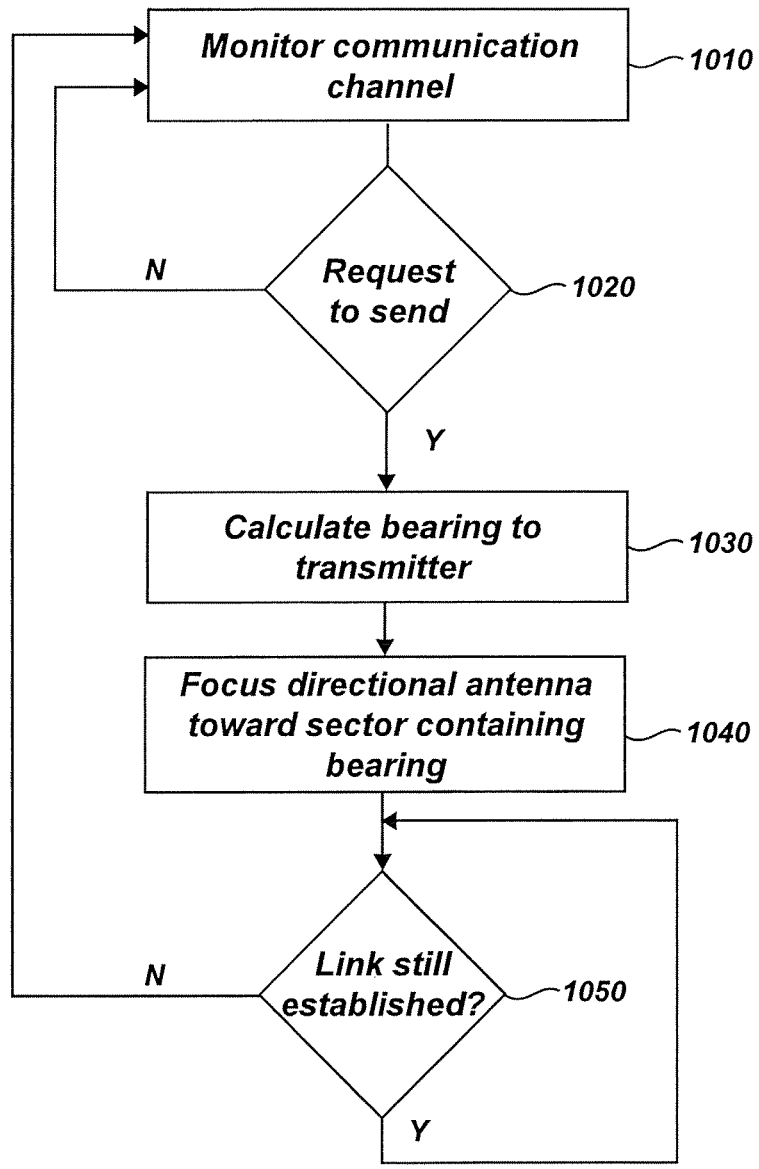
FIG. 10 is a flow diagram illustrating a method of antenna sectoring for improving the efficiency of the mesh network according to an embodiment.

FIG. 10 is a flow diagram illustrating a method of antenna sectoring for improving the efficiency of the mesh network according to an embodiment. A gateway or a router monitors the communication channel for request-to-send messages (1010). When a request-to-send message is observed (1020), the gateway or the router calculates the bearing to the transmitter (1030). The gateway or the router focuses the antenna beam toward the sector containing the bearing (1040). The sectors may be the same for the entire mesh network or they may be unique to the individual router or mesh point. The gateway or the router monitors the link. If the link is no longer established (1050), the gateway or the router begins to monitor the communication channel (1010).

Figure 11:
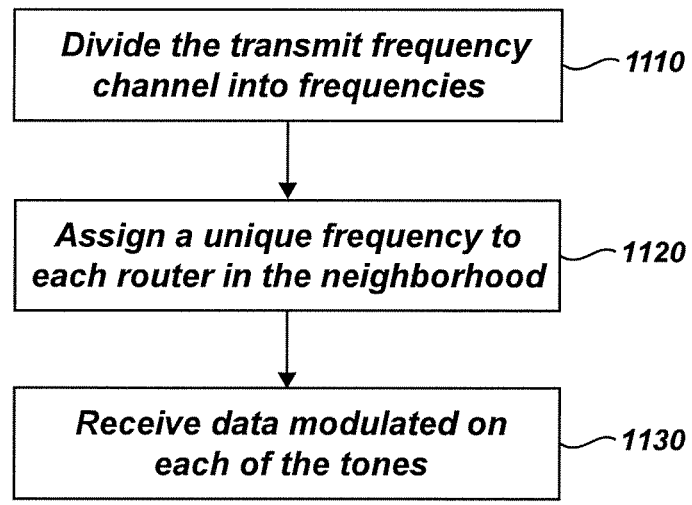
FIG. 11 is a flow diagram illustrating a method of OFDMA for increasing the frequency reuse to reduce the spectral efficiency of the mesh network according to an embodiment.

FIG. 11 is a flow diagram illustrating a method of OFDMA for increasing the frequency reuse to reduce the spectral efficiency of the mesh network according to an embodiment. The gateway divides the transmit frequency channel into multiple frequencies (1110). A unique frequency is assigned to each router in the neighborhood (1120). The routers establish data links centered on each of the tones. The gateway receives data from the routers modulated on each of the tones (1130).

Figure 12:
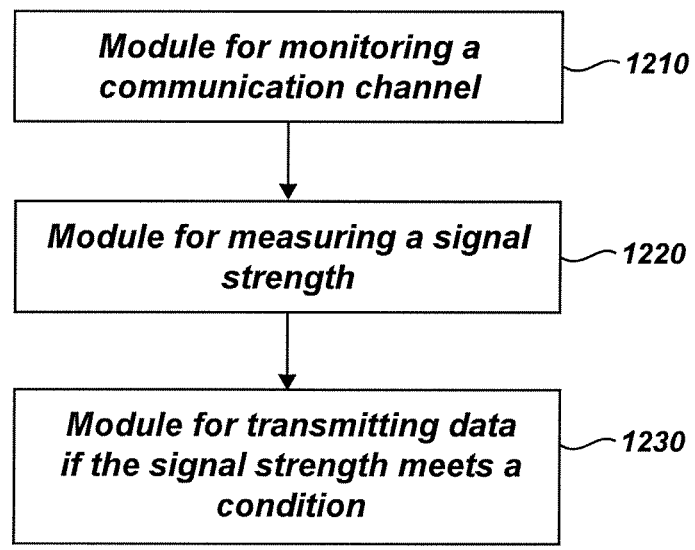
FIG. 12 is a block diagram illustrating exemplary components for the apparatus and the means for apparatus for managing use of a communication channel in a mesh network according to an embodiment.

FIG. 12 is a block diagram illustrating exemplary components for the apparatus and the means for apparatus for managing use of a communication channel in a mesh network according to an embodiment. The apparatus may include a module 1210 for monitoring a communication channel for one or more carriers, a module 1220 for measuring a signal strength for each of the one or more carriers, and a module 1230 for transmitting data if the signal strength meets a condition.

Those skilled in the art will appreciate that the various illustrative logical blocks, modules, circuits, and algorithms described in connection with the embodiments disclosed herein may be implemented as electronic hardware, computer software, or combinations of both. To illustrate this interchangeability of hardware and software, various illustrative components, blocks, modules, circuits, and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processing device, a digital signal processing device (DSP), an application specific integrated circuit (ASIC), a field programmable gate array (FPGA) or other programmable logic device, discrete gate or transistor logic, discrete hardware components, or any combination thereof designed to perform the functions described herein. A general purpose processing device may be a microprocessing device, but in the alternative, the processing device may be any conventional processing device, processing device, microprocessing device, or state machine. A processing device may also be implemented as a combination of computing devices, e.g., a combination of a DSP and a microprocessing device, a plurality of microprocessing devices, one or more microprocessing devices in conjunction with a DSP core or any other such configuration.

The apparatus, methods or algorithms described in connection with the embodiments disclosed herein may be embodied directly in hardware, software, or combination thereof. In software the methods or algorithms may be embodied in one or more instructions that may be executed by a processing device. The instructions may reside in RAM memory, flash memory, ROM memory, EPROM memory, EEPROM memory, registers, hard disk, a removable disk, a CD-ROM, or any other form of storage medium known in the art. An exemplary storage medium is coupled to the processing device such the processing device can read information from, and write information to, the storage medium. In the alternative, the storage medium may be integral to the processing device. The processing device and the storage medium may reside in an ASIC. The ASIC may reside in a user terminal. In the alternative, the processing device and the storage medium may reside as discrete components in a user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The disclosure may be embodied in other specific forms without departing from its spirit or essential characteristics. The described embodiments are to be considered in all respects only as illustrative and not restrictive and the scope of the disclosure is, therefore, indicated by the appended claims rather than by the foregoing description. All changes which come within the meaning and range of equivalency of the claims are to be embraced within their scope.

What is claimed is:

1. A method of managing a communications resource in a mesh network, comprising:
   monitoring a communication channel for a request-to-send message;
   determining a bearing to the request-to-send message;
   identifying a sector containing the bearing, wherein the identified sector conforms to a mesh network sectoring scheme;
   scheduling a time for signal transmission based on the identity of the sector containing the bearing and based on a time division multiple access scheme defined to synchronize transmissions among sectors in the mesh network sectoring scheme; and
   transmitting a signal at the scheduled time to adjust a directional antenna toward the sector containing the bearing.

2. The method of claim 1, wherein the signal indicates a primary lobe width for the sector of between about 90 degrees and about 150 degrees.

3. The method of claim 1, wherein the signal indicates a primary lobe width for the sector of between about 110 degrees and about 130 degrees.

4. The method of claim 1, further comprising:
   comparing the bearing to a sector table to identify the sector containing the bearing.

5. The method of claim 4, wherein the signal corresponds to an angle in the sector table.

6. A non-transitory machine-readable medium comprising instructions that upon execution cause a machine to:
   monitor a communication channel for a request-to-send message;
   determine a bearing to the request-to-send message;
   identify a sector containing the bearing, wherein the identified sector conforms to a mesh network sectoring scheme;
   schedule a time for signal transmission based on the identity of the sector containing the bearing and based on a time division multiple access scheme defined to synchronize transmissions among sectors in the mesh network sectoring scheme; and
   transmit a signal at the scheduled time to adjust a directional antenna toward the sector containing the bearing.

7. The non-transitory machine-readable medium of claim 6, wherein the signal indicates a primary lobe width for the sector of between about 90 degrees and about 150 degrees.

8. The non-transitory machine-readable medium of claim 6, wherein the signal indicates a primary lobe width for the sector of between about 110 degrees and about 130 degrees.

9. The non-transitory machine-readable medium of claim 6, further comprising instructions that upon execution cause a machine to:
   compare the bearing to a sector table to identify the sector containing the bearing.

10. The non-transitory machine-readable medium of claim 9, wherein the signal corresponds to an angle in the sector table.

11. An apparatus for managing a communications resource in a mesh network, comprising:
   a gateway or a router configured to monitor a communication channel for a request-to-send message, configured to determine a bearing to the request-to-send message, configured to identify a sector containing the bearing, wherein the identified sector conforms to a mesh network sectoring scheme, configured to schedule a time for signal transmission based on the identity of the sector containing the bearing and based on a time division multiple access scheme defined to synchronize transmissions among sectors in the mesh network sectoring scheme, and configured to transmit a signal at the scheduled time to adjust a directional antenna toward the sector containing the bearing.

12. The apparatus of claim 11, wherein the signal indicates a primary lobe width for the sector of between about 90 degrees and about 150 degrees.

13. The apparatus of claim 11, wherein the signal indicates a primary lobe width for the sector of between about 110 degrees and about 130 degrees.

14. The apparatus of claim 11, wherein the gateway or the router is further configured to compare the bearing to a sector table to identify the sector containing the bearing.

15. The apparatus of claim 14, wherein the signal corresponds to an angle in the sector table.

16. An apparatus for managing a communications resource in a mesh network, comprising:
   means for monitoring a communication channel for a request-to-send message;
   means for determining a bearing to the request-to-send message;
   means for identifying a sector containing the bearing, wherein the identified sector conforms to a mesh network sectoring scheme;
   means for scheduling a time for signal transmission based on the identity of the sector containing the bearing and based on a time division multiple access scheme defined to synchronize transmissions among sectors in the mesh network sectoring scheme; and
   means for transmitting a signal at the scheduled time to adjust a directional antenna toward the sector containing the bearing.

17. The apparatus of claim 16, wherein the signal indicates a primary lobe width for the sector of between about 90 degrees and about 150 degrees.

18. The apparatus of claim 16, wherein the signal indicates a primary lobe width for the sector of between about 110 degrees and about 130 degrees.

19. The apparatus of claim 16, further comprising:
 means for comparing the bearing to a sector table to identify the sector containing the bearing.

20. The apparatus of claim 19, wherein the signal corresponds to an angle in the sector table.

* * * * *